United States Patent [19]

Decker et al.

[11] Patent Number: 5,800,937
[45] Date of Patent: Sep. 1, 1998

[54] CURRENT INTERRUPT DEVICE FOR SECONDARY BATTERIES

[75] Inventors: Edward V. Decker, Suwanee; George Thomas; Venus Desai, both of Lawrenceville; Vernon Meadows, Lilburn, all of Ga.; Mark Bresin, Plantation, Fla.

[73] Assignee: Motorola, Inc., Schaumburg, Ill.

[21] Appl. No.: 848,853

[22] Filed: May 2, 1997

[51] Int. Cl.⁶ .................................................. H01M 2/00
[52] U.S. Cl. .................................................. 429/7; 429/61
[58] Field of Search ........................ 429/7, 8, 61, 62, 429/57, 59

[56] References Cited

U.S. PATENT DOCUMENTS

| | | |
|---|---|---|
| 2,876,271 | 3/1959 | Cahoon ............................. 429/7 X |
| 3,811,944 | 5/1974 | Liang et al. ......................... 429/7 |
| 4,209,571 | 6/1980 | Bessett et al. ...................... 429/7 |
| 4,315,364 | 2/1982 | Leffingwell ....................... 429/7 X |
| 4,452,867 | 6/1984 | Conforti ......................... 429/61 X |
| 5,358,798 | 10/1994 | Kleinert, III et al. .................. 429/7 |

*Primary Examiner*—Anthony Skapars
*Attorney, Agent, or Firm*—Felipe J. Farley

[57] ABSTRACT

A secondary battery (100) includes a cell (110) having a positive terminal (115) and a negative terminal (120), a device (130, 140) for coupling the positive terminal (115) to the negative terminal (120) in response to swelling of the cell (100), and a fuse (125) coupled between the positive terminal (115) and the negative terminal (120) in response to swelling of the cell (110).

According to another aspect of the present invention, a secondary battery (700) has external contacts (150, 155) and includes a cell (110) having a positive terminal (115) and a negative terminal (120) that are coupled to the external contacts (150, 155) during normal cell operation. In response to swelling of the cell (110), a device (705, 720, 725, 730, 735) decouples at least one of the positive and negative terminals (115, 120) from at least one of the external contacts (150, 155) in response to swelling of the cell (110).

12 Claims, 4 Drawing Sheets

100

CURRENT INTERRUPT DEVICE FOR SECONDARY BATTERIES

TECHNICAL FIELD

This invention relates in general to batteries, and more specifically to safety devices for use in secondary batteries having cells that swell when overcharged.

BACKGROUND

Secondary batteries are convenient for use with consumer items, such as cellular telephones, because such batteries can be recharged after depletion. Typically, once depleted from use by the telephone or other host device, a secondary battery is inserted into a charger that provides a current to recharge the battery. Circuitry within the charger senses battery voltage and terminates charging once a predetermined battery voltage has been reached.

When an incompatible charger is used or when the sensing circuitry within the charger malfunctions, however, the battery can be inadvertently overcharged. Overcharging can result in degradation of battery performance, decreased battery life, or even fire or explosion. In particular, lithium-ion polymer battery cells swell and can ignite when overcharged.

Thus, what is needed is a safety device for terminating the overcharging of secondary batteries.

DETAILED DESCRIPTION OF THE PREFERRED EMBODIMENT

Figure 1:
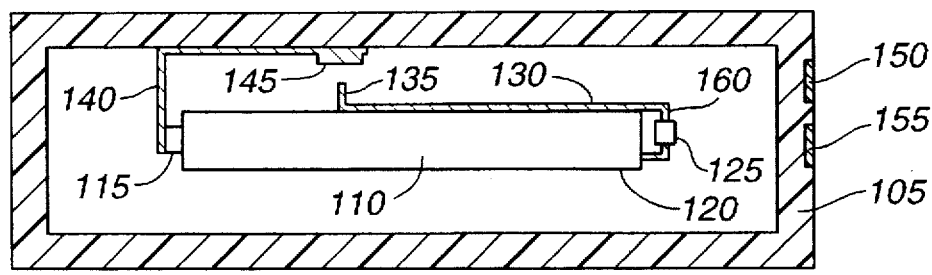
FIG. 1 is a side view of a secondary battery including a current interrupt device in accordance with a first embodiment of the present invention.

FIG. 1 is a side view of a secondary battery 100, such as a lithium-ion battery or a lithium-ion polymer battery, that expands when overcharged. The battery 100 includes a cell arrangement comprising at least one cell 110 having a positive terminal 115 and a negative terminal 120. A housing 105 surrounds and contains the cell 110 and other electrical circuitry for performing conventional battery functions. For instance, a thermistor (not shown) can be included in the battery 100 for providing temperature information to a charger that is used to charge the battery 100. The secondary battery 100 is coupled to external devices, such as host devices and chargers, via external contacts 150, 155. It will be appreciated that various number of contacts can be provided depending upon the specifications of various batteries, chargers, and host devices.

According to the present invention, the battery 100 includes a mechanical device for providing a current interrupt function in response to swelling of the cell 110, such as occurs when the cell 110 is overcharged. This mechanical device can take several different forms.

According to a first embodiment of the present invention, shown in FIG. 1, the mechanical current interrupt device includes a first conductor coupled to the negative terminal 120 through the fuse 125, which can, for instance, be a conventional leaded device. A second conductor is coupled to the positive terminal 115, and the two conductors are positioned within the housing 105 so that they are electrically isolated from one another during normal cell operation, i.e., as long as the cell 110 has not swelled. The positive and negative terminals 115, 120 are coupled in some manner, such as through other battery circuitry, to the positive and negative external contacts 150, 155, respectively. Preferably, electrical connections to the negative terminal 120 are made on the far side 160 of the fuse 125. More specifically, circuitry and contacts are coupled to the negative terminal 120 such that any electrical signals to or from the negative terminal 120 pass through the path provided by the fuse 125.

The first conductor preferably comprises a first metal tab 130 that is connected to the fuse 125, which is connected to the negative terminal 120. The metal tab 130 is bent over the top of the cell 110 and terminates in a central location thereof. Extending upwards from the tab 130 is an upright portion 135 that can comprise a bent portion of the tab 130 itself or a separately formed conductive element, such as a pin formed on the end of the tab 130. The second conductor comprises a second metal tab 140 that is connected to the positive terminal 115. The tab 140 extends upwards towards the housing 105 and is then bent to run parallel and adjacent to the housing 105. The tab 140 terminates in a location roughly above the region where the first tab 130 terminates and can include a contact 145 or other enlarged portion at its end. As shown, the first and second tabs 130, 140 do not normally make electrical contact.

It will be appreciated by one of ordinary skill in the art that electrical connections between the fuse 125 and the first conductor and between various portions of the first and second conductors, such as the tab 130, the upright portion 135, the tab 140, and the contact 145, can be made in various conventional ways. For instance, electrical connections can be made by soldering, welding, riveting, etc.

Figure 2:
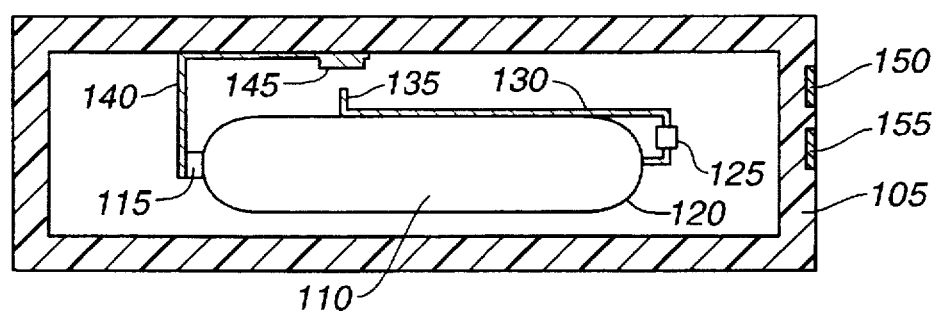
FIG. 2 is a side view of the secondary battery of FIG. 1 after interruption of current flow in accordance with the first embodiment of the present invention.

FIG. 2 illustrates the battery 100 once the secondary cell 110 has swollen as a result of overcharging or other stresses. As shown, swelling of the cell 110 pushes the first conductor upwards in the housing 105, causing the upright portion 135 to come into electrical contact with the enlarged portion 145 of the second conductor. In this way, the positive terminal 115 couples to the negative terminal 120, shorting the cell 110 and causing the fuse 125 to open. As a result, all current to or from the cell 110 is interrupted to prevent further current flow and further expansion of the cell 110.

Figure 3:
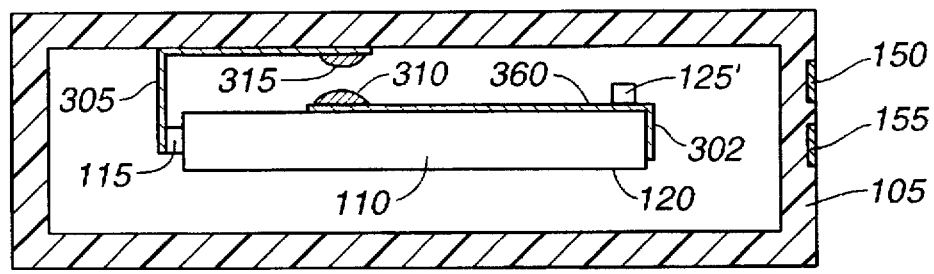
FIG. 3 is a side view of a secondary battery including a current interrupt device in accordance with a second embodiment of the present invention.

Referring next to FIG. 3, a second embodiment of a battery 300 in accordance with the present invention is shown. The battery 300, like the battery 100, includes a housing 105, external contacts 150, 155, a cell 110 that swells when overcharged, and a mechanical device for interrupting current flow in response to cell expansion. The cell 110 has a positive terminal 115 and a negative terminal 120 for providing power via at least the contacts 150, 155. Preferably, the negative external contact 155 and any electrical circuitry are coupled to the negative terminal 120 through a fuse 125', such as at a far side 360 of the fuse 125', which is connected to the negative terminal 120.

The mechanical current interrupt device of the battery 300 includes a first conductor coupled to the negative terminal 120 through the fuse 125' and a second conductor coupled to the positive terminal 115. During normal cell operation, the first and second conductors are electrically isolated from one another. According to the second embodiment of the present invention, the first conductor comprises a first flexible substrate 302 formed from a conventional material, such as polyimide, on which electrical circuitry is plated. The electrical circuitry is generally covered with an insulative material, such as polyimide, although contacts and pads for providing electrical signals to and from the circuitry of the flexible substrate 302 are preferably left uncovered. The flexible substrate 302 includes a first end that is coupled to the negative terminal 120 in a conventional manner. The substrate 302 is bent to follow the shape of the cell 110 and to rest upon a surface of the cell 110. A second end of the substrate 302 includes a solder ball 310 disposed thereon. The electrical circuitry (not shown) of the substrate 302 electrically connects the solder ball 310 to the negative terminal 120 through the fuse 125', which is preferably a surface mount component mounted to pads of the substrate 302 in a conventional manner.

The second conductor comprises a second flexible substrate 305 that has a first end electrically connected to the positive terminal 115. The substrate 305 extends upwards from the cell 110 to contact and run parallel with the battery housing 105. A second end of the substrate 305, on which a solder ball 315 is disposed, is positioned adjacent to the housing 105 substantially above the solder ball 310 of the first flexible substrate 302.

Figure 4:
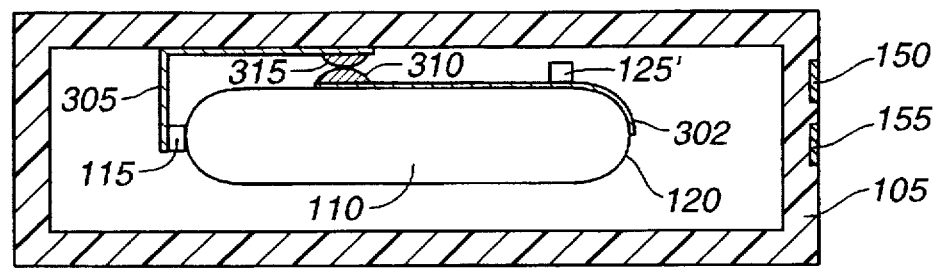
FIG. 4 is a side view of the secondary battery of FIG. 3 after interruption of current flow in accordance with the second embodiment of the present invention.

FIG. 4 illustrates the battery 300 once the cell 110 has expanded, such as in response to overcharging. As shown, swelling of the cell 110 pushes the substrate 302 upwards so that the solder ball 310 of the first flexible substrate 302 contacts the solder ball 315 of the second flexible substrate 305, causing an electrical connection between the positive and negative terminals 115, 120 via the fuse 125'. This short circuit results in opening of the fuse 125', thereby interrupting current flow to and from the battery 300 to prevent further overcharging and further swelling of the cell 110.

It will be appreciated that the mechanical safety devices illustrated in FIGS. 1–4 provide a highly reliable method of interrupting current flow and preventing cell expansion. Furthermore, since the devices comprise novel arrangements of low cost items, such as metal tabs, flexible substrates, and conventional fuses, the mechanical safety devices according to the present invention can be incorporated in secondary batteries without great expense. Conversely, conventional safety circuitry for use in secondary batteries often includes precision electrical devices that can be both very expensive and very fragile, which can affect reliability and product cost.

Figure 5:
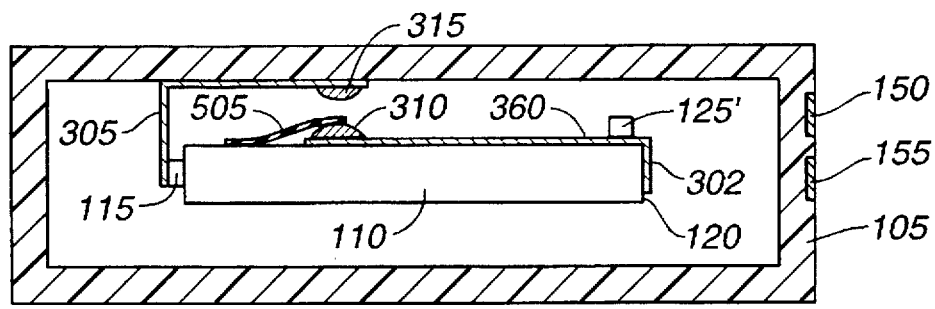
FIG. 5 is a side view of a secondary battery including a current interrupt device in accordance with a third embodiment of the present invention.

Referring next to FIG. 5, a third embodiment of a battery 500 in accordance with the present invention is shown. The battery 500 includes a mechanical safety device similar to that shown in FIGS. 3 and 4, but the battery 500 also includes an additional safety mechanism. Specifically, the battery 500 includes first and second flexible substrates 302, 305 that are arranged, as in FIG. 3, to be electrically isolated during normal cell operation. Additionally, the battery 500 includes an insulator 505, such as a piece of paper or plastic, positioned between the solder balls 310, 315. The insulator 505 can, for instance, be glued or taped to the cell 110 so that it covers the solder ball 310. In this way, compression of the battery housing 105, such as could occur when the battery 500 is dropped, will not cause inadvertent contact between the solder balls 310, 315.

Figure 6:
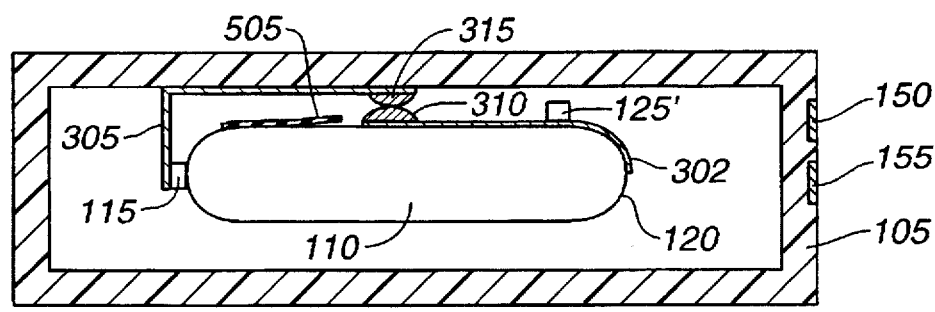
FIG. 6 is a side view of the secondary battery of FIG. 5 after interruption of current flow in accordance with the third embodiment of the present invention.

FIG. 6 illustrates the battery 500 when the cell 110 has swollen, in which case expansion of the cell 110 pulls the insulator 505 from between the two solder balls 310, 315 and pushes the solder ball 310 into contact with the solder ball 315, shorting the cell 110 and blowing the fuse 125', though which all circuitry is connected to the negative terminal 120.

Figure 7:
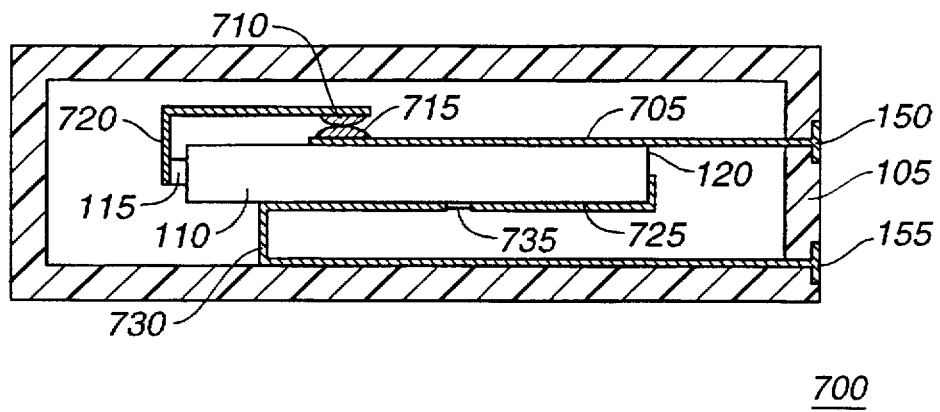
FIG. 7 is a side view of a secondary battery including a current interrupt device in accordance with a fourth embodiment of the present invention.

FIG. 7 shows a fourth embodiment of a battery 700 in accordance with the present invention. The mechanical current interrupt device of the battery 700 includes first and second conductors that are electrically isolated and that provide power to an external device via positive and negative external contacts 150, 155. The first conductor preferably includes first and second portions 705, 720 that are electrically coupled during normal cell operation. According to the present invention, the first and second portions 705, 720 can be formed using metal tabs or flexible substrates. For convenience, however, the first and second portions will hereafter be referred to as first and second metal tabs 705, 720. The first tab 705 is electrically coupled to the positive external contact 150 at a first end, although it will be appreciated that the first end of the first tab 705 could alternatively be coupled to battery circuitry that, in turn, couples to the external contact 150. The first tab 705 extends to rest upon a surface of the cell 110 and terminates in a second end having an enlarged region 715, which can be formed, for instance, by a solder ball disposed on the tab 705 or a contact mounted thereto. The second tab 720 of the first conductor has a first end electrically coupled to the positive terminal 115 and a second end having an enlarged region 710, e.g., a contact or solder ball. The second tab 720 is formed and positioned so that the enlarged region 710 normally rests in contact with the enlarged region 715 of the first tab 705, providing an electrical path between the positive terminal 115 and the positive external contact 150 via the first and second tabs 705, 720.

The second conductor includes first, second, and third portions 725, 730, 735 that can be metal tabs, flexible substrates, or even conventional wires. The first portion 725, which will hereafter be referred to as the first metal tab 725 for simplicity, has a first end that is coupled to the negative terminal 120. The tab 725 is formed to bend around the bottom surface of the cell 110 and terminate in a second end that is positioned adjacent to the bottom surface of the cell 110. The second portion 730, which will hereafter be referred to as the second metal tab 730 of the second conductor for simplicity, is coupled at a first end to the negative external contact 155, either directly as shown or via electrical circuitry (not shown). The tab 730 extends across the bottom, internal surface of the housing 105 and is bent up to contact the bottom surface of the cell 110. A second end of the tab 730 is positioned adjacent to the bottom surface of the cell 110 a short distance, such as a centimeter, away from the end of the tab 725. The third portion 735 of the second conductor electrically couples the tab 725 to the tab 730. Preferably, the third portion 735 comprises a relatively thin wire or tab that can be easily broken.

Alternatively, the third portion 735 could be electrically coupled to the first and second tabs 725, 730 by one or more relatively weak connections.

Figure 8:
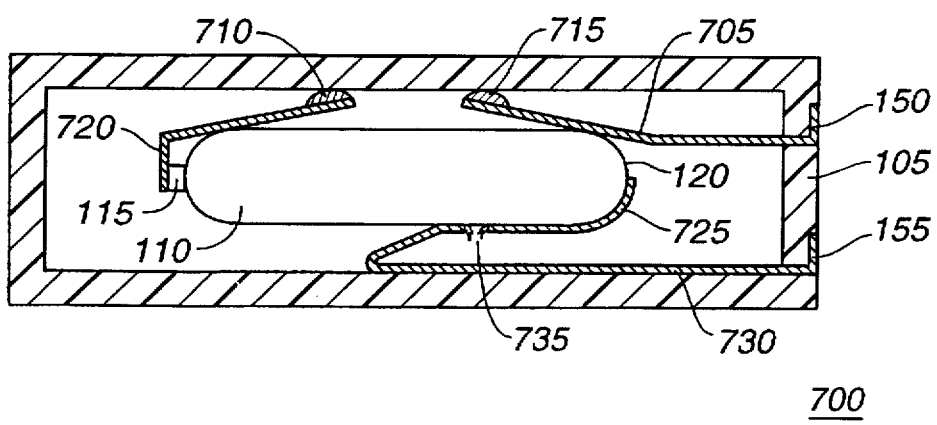
FIG. 8 is a side view of the secondary battery of FIG. 7 after interruption of current flow in accordance with the fourth embodiment of the present invention.

FIG. 8 illustrates the battery 700 after cell expansion, in which case the swelling of the cell 110 pushes both the first and second metal tabs 705, 720 of the first conductor upwards and out of contact with each other, thereby decoupling the positive terminal 115 from other cell circuitry and from the positive external contact 150. As a result, further cell overcharging and swelling is prevented. The unique formation and positioning of the second conductor provides redundant safety features because expansion of the cell 110 pushes downwards on the tabs 725, 730 and on the portion 735, thereby causing either the portion 735 to break or a connection between the portion 735 and the tabs 725, 730 to break. This results in decoupling of the negative terminal 120 from cell circuitry and the negative external contact 155.

It will be understood by one of ordinary skill that either of the first and second conductors depicted in FIGS. 7 and 8 can function alone to interrupt current flow in the event of cell expansion. However, use of the two novel conductors together provides an added measure of safety to ensure that, upon cell swelling, all current to and from the battery 700 is interrupted.

In summary, a secondary battery as described above includes a mechanical current interrupt device that permits current flow to and from the battery during normal cell operation. However, in response to cell expansion, as could occur in the event of overcharging, the current interrupt device functions to provide isolation between the expanded battery cell and external contacts, thereby conveniently preventing further expansion and further overcharging before the situation becomes critical.

According to the present invention, the mechanical safety device includes a first conductor that provides electrical connectivity between the positive cell terminal and a positive external contact and a second conductor that provides electrical connectivity between the negative cell terminal and a negative external contact. The first and second conductors are normally electrically isolated, but are pushed into contact by cell expansion, thereby blowing a fuse in the circuit. As a result, the cell is electrically isolated so that overcharging cannot continue. According to another aspect of the present invention, no fuse is necessary because the electrical paths provided by the first and second conductors are physically broken when the cell swells.

As mentioned, the mechanical device preferably comprises metal tabs, flexible substrates, or even wires so that the device can be manufactured and assembled with little expense. At the same time, the mechanical device is relatively rugged and resistant to both mechanical and electrical failure.

Conventional safety circuitry, on the other hand, often includes expensive precision devices that are fragile and easily succumb to mechanical or electrical stresses. As a result, a battery that uses conventional safety circuitry is likely to be both more expensive and less safe than a battery that uses the mechanical safety device of the present invention.

Thus, it will be appreciated by now that there has been provided an improved safety device for terminating the overcharge of secondary batteries.

What is claimed is:

1. A secondary battery having a current interrupt device, comprising:

a cell having a positive terminal and a negative terminal;

a device for coupling the positive terminal to the negative terminal in response to swelling of the cell; and a fuse coupled between the positive terminal and the negative terminal in response to swelling of the cell.

2. The secondary battery of claim 1, wherein the fuse opens in response to coupling of the positive terminal to the negative terminal by the device.

3. The secondary battery of claim 1, further comprising:

a housing that surrounds and contains the cell, the device, and the fuse.

4. The secondary battery of claim 1, wherein the device comprises:

a first conductor coupled to the negative terminal; and a second conductor coupled to the positive terminal, wherein, during normal cell operation, the first conductor is electrically isolated from the second conductor.

5. The secondary battery of claim 4, wherein the fuse is coupled between the second conductor and the positive terminal.

6. The secondary battery of claim 4, wherein the fuse is coupled between the first conductor and the negative terminal.

7. The secondary battery of claim 4, wherein the fuse is a surface mount component that is mounted to one of the first and second conductors.

8. The secondary battery of claim 4, wherein the first and second conductors comprise flexible substrates with electrical circuitry formed thereon.

9. The secondary battery of claim 4, wherein the first and second conductors are situated to make electrical contact when the cell swells during overcharge.

10. The secondary battery of claim 4, wherein:

the fuse is connected to the negative terminal;

the first conductor comprises a first metal tab connected to the fuse; and the second conductor comprises a second metal tab connected to the positive terminal, wherein, during normal cell operation, the first metal tab is electrically isolated from the second metal tab and, when the cell is overcharged, the first metal tab contacts the second metal tab, causing the fuse to open.

11. The secondary battery of claim 4, wherein:

the first conductor comprises a first flexible substrate having a first solder ball disposed thereon and having circuitry coupled to the first solder ball and to the negative terminal through the fuse; and the second conductor comprises a second flexible substrate having a second solder ball disposed thereon and having circuitry coupled to the second solder ball and to the positive terminal, wherein, during normal cell operation, the circuitry of the first flexible substrate is electrically isolated from the circuitry of the second flexible substrate and, when the cell is overcharged, the first solder ball contacts the second solder ball, causing the fuse to open.

12. The secondary battery of claim 4, further comprising:

an insulator positioned between the first conductor and the second conductor, wherein, when the cell swells during overcharge, the insulator is pulled from between the first conductor and the second conductor.

* * * * *